INVENTORS
ROHE V. PENNINGTON
JOHN P. RICH
BY
Robert L. Paquin
ATTORNEY

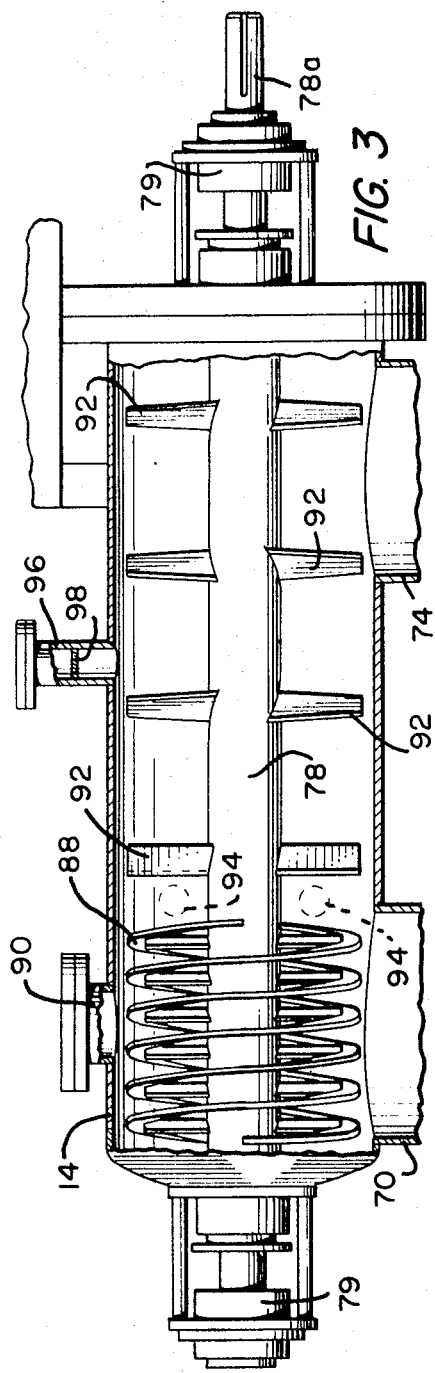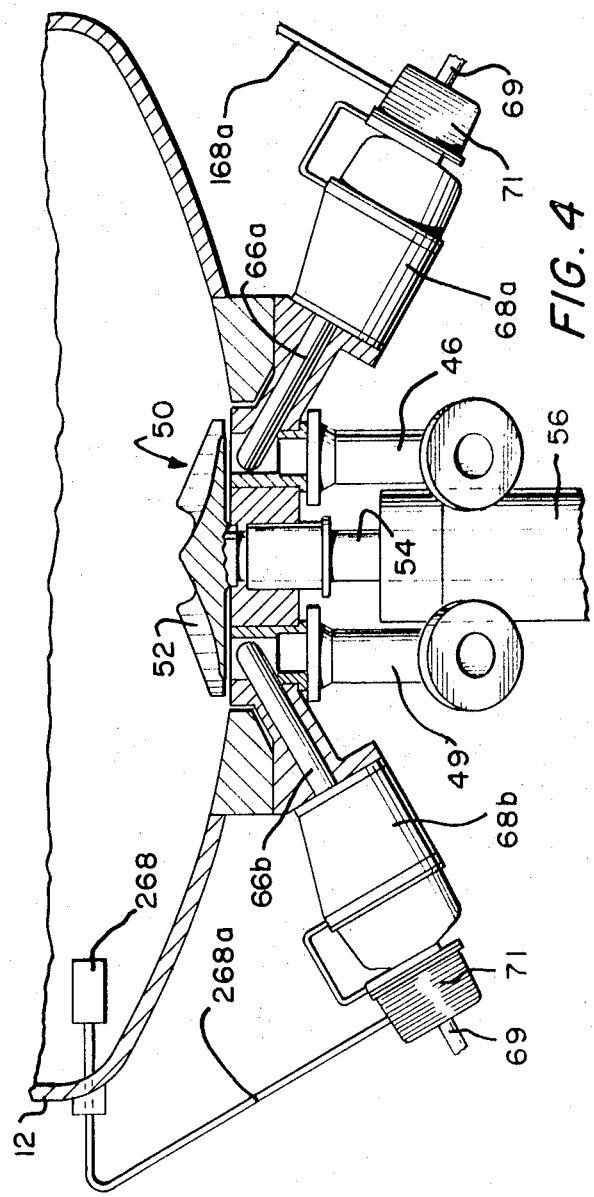

United States Patent Office 3,586,600
Patented June 22, 1971

3,586,600
CONTINUOUS DIGESTING APPARATUS
John P. Rich and Rohe V. Pennington, Nashua, N.H.,
assignors to Improved Machinery Inc., Nashua, N.H.
Filed July 27, 1967, Ser. No. 656,415
Int. Cl. D21c 7/00, 7/08
U.S. Cl. 162—237                                     6 Claims

ABSTRACT OF THE DISCLOSURE

A continuous digesting apparatus particularly adapted for small particle size cellulosic material such as sawdust, comprising an impregnation vessel wherein the cellulosic material is first intermixed and impregnated with heated cooking liquor and thereafter heated by steam to a temperature below cooking temperature, a mixing vessel wherein the impregnated cellulosic material is agitated and thence heated by steam to cooking temperature, and a cooking vessel wherein the the cook is performed. Also, a method for digesting small particle size cellulosic material through the employment of this apparatus.

BACKGROUND OF THE INVENTION

The present invention relates to continuous digesting and more particularly to the continuous digesting of cellulosic material, such as sawdust, bamboo, bagasse, straw and other vegetable fibers, of small particle size.

As is well known, the continuous digesting of small particle size, cellulosic material creates problems additional to those normally encountered in the more common, continuous digesting of wood chips. For example, during the digesting of small particle size cellulosic material, liquor penetration is substantially instantaneous and liquor circulation, due to the tightness of the packing of the material, is normally substantially impossible. For these and other reasons, as described in the August 1965 issue of Paper Industry magazine, various forms of apparatus have been developed in an attempt to provide a continuous digesting apparatus which is particularly suited for small particle size material. This conventional apparatus, however, generally has been relatively expensive, undesirably complex, and/or otherwise unsuitable for commercial application.

SUMMARY OF THE INVENTION

An object of the present invention is to provide a new and improved continuous digesting apparatus, particularly constructed and arranged for small particle size cellulosic material, which is relatively simple and economical in construction, highly efficient in operation, and otherwise well suited for commercial application.

This object is attained by the provision of a digesting apparatus basically comprising a generally upright impregnation vessel wherein the material is impregnated by cooking liquor while the liquor and material are preferably preheated by a hot fluid such as steam, a mixing vessel wherein the impregnated material is agitated and thence heated to cooking temperature by a hot fluid such as steam, and a generally upright cooking vessel wherein the heated, impregnated material cooks and thence is diluted by a diluent fluid or liquor.

BRIEF DESCRIPTION OF THE DRAWINGS

Referring to the drawings:

FIG. 3 is an enlarged, elevational sectional view of the mixing vessel of the illustrated continuous digesting apparatus; and FIG. 4 is an enlarged, elevational sectional view of the lower or discharge end of the cooking vessel of the continuous digesting apparatus.

DESCRIPTION OF THE PREFERRED EMBODIMENT

Figures 1, 2:
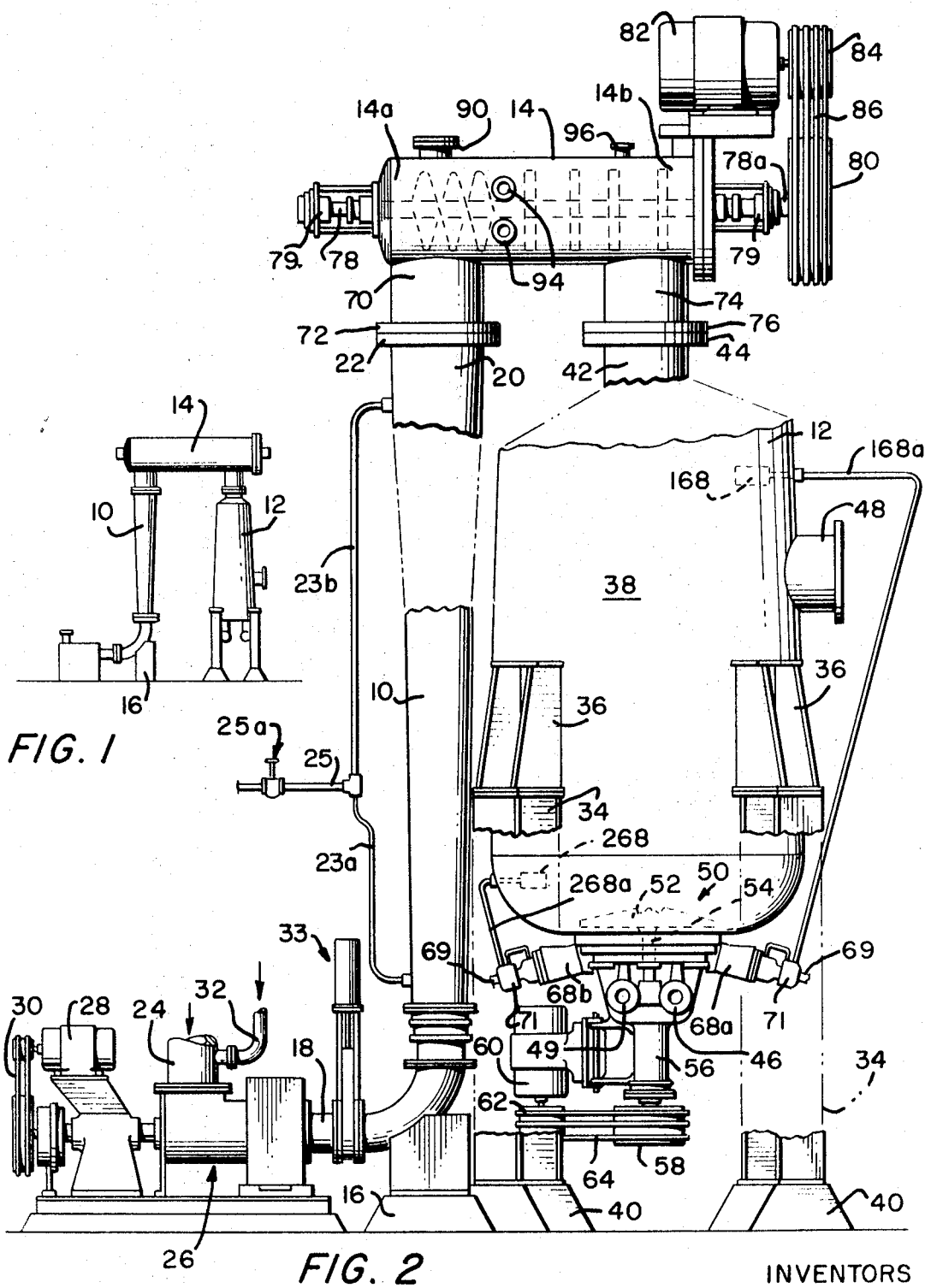
FIG. 1 is a schematic view of a continuous digesting apparatus which is constructed in accordance with the present invention.
FIG. 2, wherein parts have been broken away for the purposes of illustration, is an enlarged, elevational view of the continuous digesting apparatus shown in FIG. 1.

Referring more particularly to the drawings wherein similar reference characters designate corresponding parts throughout the several views, the illustrated continuous digesting apparatus, as shown in FIGS. 1 and 2, basically comprises a generally upright or vertical, pressurized impregnation vessel 10, a generally upright or vertical, pressurized cooking vessel 12, and a pressurized mixing vessel 14.

The impregnation vessel 10 is formed in the configuration of an elongated, circular cross-section conduit or pipe having an elbow adjacent its lower end, and is supported by a ground mounted base 16. The lower end of the impregnation vessel 10 includes an inlet designated as 18; the upper end thereof includes an outlet designated as 20 and carries an integrally formed, annular connecting flange 22. The impregnation vessel 10 is tapered in cross-section from the outlet 20 towards the inlet 18 such that its diameter increases in the direction of the flow therethrough, this tapering serving to reduce frictional losses and maintain the cellulosic material sufficiently loose to allow thorough saturation by cooking liquor.

A steam inlet conduit 23a communicates with the impregnation vessel 10 adjacent its lower end; a steam inlet conduit 23b communicates with the impregnation vessel 10 adjacent its upper end. The conduits 23a, 23b are connected through a steam supply conduit 25, containing a normally open control valve 25a, to a source (not shown) of steam to continuously receive steam from such source. The temperature of this steam is selected such that the steam preheats material in the impregnation vessel to a temperature below cooking temperature.

The inlet 18 of the impregnation vessel 10 is connected by a connecting or supply conduit 24 to a source (not shown) of cellulosic material, such as sawdust, bamboo, bagasse, straw, or other vegetable fibers, of small particle size. A thick stock pump, designated generally as 26, is connected to the conduit 24 for supplying the cellulosic material to the inlet 18 such that the material thus supplied is driven upwardly in the impregnation vessel 10 and through the outlet 20 thereof. The pump 26 is powered by a driving motor 28 through driving belt means 30 and may be of any suitable conventional construction such as, for example, that disclosed in U.S. Pat. No. 3,001,481, issued Sept. 26, 1961, to Walter N. Thompson, and assigned to the assignee of the present invention. Moreover, although not illustrated, the pump may be of the type having a top vertical discharge in which event it would be positioned directly below the impregnation vessel 10; and the aforementioned elbow in the latter would, of course, be eliminated.

Heated cooking liquor is continuously introduced into the conduit 24, and to the cellulosic material flowing therethrough, by a cooking liquor supply conduit 32. A normally open, shut-off valve designated generally as 33 is interposed in the impregnation vessel 10 intermediate the inlet 18 and the aforementioned elbow. Thus, the pump 26 and the conduit 24 may be selectively isolated from the remainder of the digesting apparatus by merely closing the shut-off valve 33.

The cooking vessel 12 is supported by a plurality of vertically extending, supporting pillars or piers 34 each rigidly connected, at its upper end, to a flange 36 formed integrally with the vessel outer wall 38 and, at its lower end, to a ground mounted base 40. The cooking vessel 12 is essentially an elongated, circular cross-section tower or tank having an inlet 42, provided with an annular connecting flange 44, at its upper end and an outlet 46 at its lower end. The cooking vessel 12 tapers in cross-section towards the inlet 42 such that its diameter increases in the direction of the outlet 46 and, intermediate its ends, includes a normally capped or closed clean-out port 48. The lower end of the cooking vessel 12 includes a dilution inlet 49 which, during the operation of the digesting apparatus, is connected to a source (not shown) of cool, dilution liquor to continuously receive dilution liquor therefrom.

The lower end of the cooking vessel 12 is also provided with a wiped orifice discharger, designated generally as 50, which is shown enlarged in FIG. 4. The discharger 50 comprises a radial flow type impeller 52, disposed within the cooking vessel 12 above the outlet 46 and the dilution liquor inlet 49, which is rigidly mounted upon the upper end of a vertically extending, supporting shaft 54. The supporting shaft 54 is rotatably mounted within a bearing column 56 and at its lower end carries a driven pulley 58. The supporting shaft 54 is continuously rotatably driven by a driving motor 60 through a driving pulley 62 and belt means 64 interconnecting the pulleys 58, 62.

The discharger 50, moreover, comprises a first axially movable plunger 66a interposed in the cooking vessel outlet 46 and a second axially movable plunger 66b interposed in the dilution liquor inlet 49. The plungers 66a, 66b are, respectively, connected to controllers 68a, 68b such that they are automatically axially movable thereby to provide variable regulation of the flow through the outlet 46 and the dilution liquor inlet 49.

The controllers 68a, 68b each include an air loaded diaphragm which is connected to their respective one of the plungers 66a, 66b to normally retain the latter in its illustrated extreme restricting position. The controllers 68a, 68b, moreover, each are connected to a source (not shown) of pressurized air through a pilot supply conduit 69 and include valves 71 operable, when electrically energized, to cause pressurized air from the pilot conduit 69 to overcome the air loading the diaphragm, whereby their respective one of the plungers 66a, 66b is moved to a less restricting position. The valve 71 of the controller 68a is connected through an electrical lead 168a to a sensor 168 (such as, for example, a gamma ray transmitting and receiving apparatus), disposed within the cooking vessel 12 and responsive to the level of material therein, to be energized thereby. The valve 71 of the controller 68b is connected through an electrical lead 268a to a sensor 268 (such as, for example, a differential pressure transmitter), disposed within the cooking vessel 12 and responsive to the pressure therein, to be energized thereby.

The mixing vessel 14 is formed in the configuration of a horizontally disposed cylinder and is positioned above the upper ends of the impregnation and cooking vessels 10, 12, respectively. The mixing vessel 14 includes an integral, depending inlet 70 at its inlet end 14a and an integral, depending outlet 74 at its outlet end 14b. The inlet 70 is provided with an annular connecting flange 72 which is bolted or otherwise rigidly connected to the connecting flange 22 (at the upper or outlet end of the impregnation vessel 10) such that material discharged by the impregnation vessel outlet 20 flows through the inlet 70 into the inlet end 14a of the mixing vessel 14. The outlet 74 is provided with an annular connecting flange 76 which is bolted or otherwise rigidly connected to the connecting flange 44 (at the upper or inlet end of the cooking vessel 12) such that material is discharged from the outlet end 14b of the mixing vessel 14 to the inlet 42 of the cooking vessel 12.

The mixing vessel 14 contains a rotor means which serves to convey material from the inlet end 14a to the outlet end 14b and which also agitates the material so conveyed. More particularly, this rotor means comprises a horizontally disposed shaft 78 which extends axially through the mixing vessel 14 and is rotatably mounted adjacent its opposing ends in bearing housings 79. The shaft 78 includes an end 78a which rigidly carries a driven pulley 80 and is rotatably driven by a driving motor 82 through a driving pulley 84 and driving belt means 86 which interconnects the pulleys 80, 84. The shaft 78, directly opposite the inlet 70, rigidly carries a helical feed screw 88, constructed to convey material from the inlet end 14a of the mixing vessel 14 towards the outlet end 14b, which includes a sharp blade-like edge. The shaft 78, throughout the remainder of its length, rigidly carries a plurality of spaced, agitating vanes 92 which are constructed to agitate material supplied thereto by the feed screw 88.

The mixing vessel 14, immediately downstream of the feed screw 88, includes a pair of integrally formed, steam supply conduits 94 which are connected through suitable conventional piping (not shown) to a source (not shown) of live steam at a temperature sufficient to heat the impregnated cellulosic material to cooking temperature. The steam supply conduits 94 serve to introduce the live steam into the mixing vessel 14 and into the material being agitated therein by the vanes 92, whereby the steam heats such material to cooking temperature. The mixing vessel 14, moreover, includes a normally closed or capped cleanout port 90 and an integrally formed, vent conduit 96, preferably containing a screen or similar perforate element 98, which communicates the interior of the mixing vessel 14 with the atmosphere. The vent conduit 96, as will be understood, serves to exhaust non-condensible gases evolved during the heating of the cellulosic material and thereby prevents the formation of low temperature areas or pockets in the cooking material such as might cause nonuniformity of the cooked material.

During the operation of the aforedescribed digesting apparatus, the pump 26 is continuously operated to draw small particle size cellulosic material from the conduit 24 and drive such material upwardly through the impregnation vessel 10. As the cellulosic material flows by the cooking liquor supply conduit 32, it becomes intermixed with heated cooking liquor which, during the subsequent passage of the cellulosic material in the impregnation vessel 10, thoroughly saturates or impregnates the cellulosic material. The impregnation process, as will be noted, is accomplished while the mixture of cellulosic material and cooking liquor is heated, to enhance such process, by steam introduced into the impregnation vessel 10 through the conduits 23a, 23b. Moreover, the impregnation vessel 10 is particularly constructed of a length suitable to allow sufficient time for thorough impregnation of the cellulosic material by the cooking liquor and, as aforementioned, is tapered to enhance the impregnation process by maintaining the cellulosic material in relatively loose condition.

The impregnated cellulosic material which is discharged by the impregnation vessel outlet 20 flows through the mixing vessel inlet 70 into the inlet end 14a of the mixing vessel 14. The feed screw 88 shaves off relatively thin slices from the upwardly moving column of this impregnated material and conveys the latter towards the outlet end 14b of the mixing vessel 14. Live steam flowing into the mixing vessel 14 through the steam supply conduits 94 heats the impregnated material to cooking temperature as the material is rotated and agitated by the agitating vanes 92 to ensure that it is uniformly so heated.

The impregnated material, thus heated to cooking temperature, is discharged from the mixing vessel 14 through the mixing vessel outlet 74 and flows through the cooking vessel inlet 42 and downwardly in the cooking vessel 12. The material, during this downward movement, is afforded sufficient time to ensure that it is thoroughly cooked. The material is thence diluted by cool diluent liquor and driven outwardly and upwardly along the wall 38 of the cooking vessel 12, for a relatively small distance, by the impeller 52. This movement of the material by the impeller 52, as will be seen, provides a uniform scrubbing action on the bottom of the pile of cooked material in the cooking vessel 12 and ensures that the material moves uniformly downwardly in the latter. The cooked material, after the scrubbing action, again drops downwardly in the cooking vessel 12 and is subsequently discharged, at a rate controlled by the plunger 66a, through the cooking vessel outlet 46.

From the aforegoing it will be seen that we have provided a new and improved apparatus for accomplishing all of the objects and advantages of our invention. It will also be seen that in accordance with the invention small particle size cellulosic material may be digested by a method, employing this apparatus, which basically comprises the steps of:

(a) introducing heated cooking liquor to the cellulosic material whereby the cellulosic material becomes intermixed with the cooking liquor;
(b) heating this mixture to a temperature substantially below cooking temperature while allowing sufficient time for the cellulosic material to become impregnated by the cooking liquor;
(c) agitating the impregnated cellulosic material and intermixing such material with steam whereby the impregnated material is heated to cooking temperature;
(d) allowing the impregnated material, thus heated to cooking temperature, sufficient time to become thoroughly cooked;
(e) intermixing cool diluent liquor with the cooked impregnated material and agitating the resultant mixture; and
(f) discharging such mixture at a controlled rate.

It will be understood that, although we have illustrated and hereinbefore specifically described only a single embodiment of our invention, the invention is not limited merely to this single embodiment but rather contemplates other embodiments and variations employing its concepts and teachings.

Having thus described our invention, we claim:

1. An apparatus for the continuous digesting of small particle size cellulosic material, comprising a generally upright elongated impregnation vessel having an inlet at its lower end and an outlet at its upper end, supply conduit means connected to said impregnation vessel inlet for communicating such inlet with a source of the small particle size cellulosic material, pump means operatively associated with said supply conduit means for pumping the cellulosic material through said impregnation vessel inlet whereby the material is driven upwardly through said impregnation vessel towards said outlet thereof, first steam supply means connected to said impregnation vessel for supplying steam to said impregnation vessel to heat cellulosic material therein to a temperature below cooking temperature, liquor supply means for supplying cooking liquor to the cellulosic material upstream of the supply of such steam to said impregnation vessel whereby the cooking liquor becomes intermixed with the cellulosic material prior to the supply of such steam and the cooking liquor thereafter impregnates the intermixed cellulosic material in said impregnation vessel while the mixture of cooking liquor and cellulosic material is being heated to a temperature below cooking temperature by such steam, a generally upright elongated cooking vessel having an inlet at its upper end and an outlet at its lower end, a mixing vessel having an inlet connected to said impregnation vessel outlet to receive heated impregnated material therefrom and an outlet connected to said cooking vessel inlet to discharge material thereto, rotatable means in said mixing vessel for conveying impregnated material from said mixing vessel inlet towards said mixing vessel outlet and for agitating the conveyed impregnated material, second steam supply means connected to said mixing vessel for supplying steam at a temperature sufficient to heat the impregnated material to cooking temperature to the agitated impregnated material in said mixing vessel whereby such steam heats such agitated impregnated material to cooking temperature in said mixing vessel, diluent liquid supply means connected to said cooking vessel for supplying diluent liquid to cooked material in said cooking vessel, agitating means in said cooking vessel adjacent said cooking vessel outlet for agitating material in said cooking vessel, and valving means controlling the discharge of material through said cooking vessel outlet.

2. A digesting apparatus according to claim 1, wherein said agitating means in said cooking vessel comprises a rotatable radial flow impeller for driving material in said cooking vessel outwardly and along the wall of the cooking vessel.

3. A digesting apparatus according to claim 1, wherein said liquor supply means is connected to said supply conduit means to supply the cooking liquor thereto upstream of said pump means.

4. A digesting apparatus according to claim 1, wherein said rotatable means in said mixing vessel comprises a sharp edged helical portion adjacent said mixing vessel inlet and a plurality of agitating vanes adjacent said mixing vessel outlet, vent means is connected to said mixing vessel to vent non-condensible gas from the mixing vessel, said pump means comprises a thick stock pump, and valve means is provided for shutting off the pump means and the supply conduit means from the cooking vessel.

5. A digesting apparatus according to claim 1, wherein said agitating means in said cooking vessel comprises a rotatable impeller in the lower end of said cooking vessel for driving material outwardly and upwardly along the wall of said cooking vessel, said cooking vessel outlet and said diluent liquid supply means are connected to said cooking vessel below said impeller, and valving means are provided for controlling the flow of diluent liquid through the diluent liquid supply means.

6. A digesting apparatus according to claim 5, further comprising controlling means actuatable for adjusting said valving means in said cooking vessel outlet and said diluent liquid supply means, and means responsive to the pressure and level of material in said cooking vessel for actuating said controlling means.

References Cited

UNITED STATES PATENTS

| | | | |
|---|---|---|---|
| 2,858,213 | 10/1958 | Durant et al. | 162—61 |
| 3,243,341 | 3/1966 | Lang | 162—237 |
| 3,434,920 | 3/1969 | Green | 162—238 |
| 3,434,921 | 3/1969 | Rich | 162—237 |
| 3,475,271 | 10/1969 | Laakso | 162—246 |
| 2,870,009 | 1/1959 | Richter | 162—19 |
| 3,041,233 | 6/1962 | Richter | 162—246 |
| 3,144,381 | 8/1964 | Simon | 162—246 |
| 3,332,836 | 7/1967 | Lowgren et al. | 162—19 |

FOREIGN PATENTS

| | | | |
|---|---|---|---|
| 1,274,031 | 9/1961 | France | 162—237 |

S. LEON BASHORE, Primary Examiner

T. G. SCAVONE, Assistant Examiner

U.S. CL. X.R.

162—238, 243, 246